(12) United States Patent
Lassoued et al.

(10) Patent No.: US 11,024,169 B2
(45) Date of Patent: Jun. 1, 2021

(54) METHODS AND SYSTEMS FOR UTILIZING VEHICLES TO INVESTIGATE EVENTS

(71) Applicant: INTERNATIONAL BUSINESS MACHINES CORPORATION, Armonk, NY (US)

(72) Inventors: Yassine Lassoued, Dublin (IE); Julien Monteil, Dublin (IE); Martin Mevissen, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/564,126

(22) Filed: Sep. 9, 2019

(65) Prior Publication Data

US 2021/0074155 A1    Mar. 11, 2021

(51) Int. Cl.
| | |
|---|---|
| *G08G 1/0967* | (2006.01) |
| *G08B 13/196* | (2006.01) |
| *G05D 1/02* | (2020.01) |
| *G05D 1/00* | (2006.01) |
| *H04L 29/08* | (2006.01) |
| *G06K 9/00* | (2006.01) |

(52) U.S. Cl.
CPC ..... *G08G 1/096791* (2013.01); *G05D 1/0094* (2013.01); *G05D 1/0287* (2013.01); *G06K 9/00711* (2013.01); *G08B 13/19673* (2013.01); *H04L 67/12* (2013.01); *G06K 2009/00738* (2013.01)

(58) Field of Classification Search
CPC ...... B60W 50/14; B60W 50/16; B60W 60/00; G01C 21/28; G01C 21/30; G01C 21/34; G01S 13/93; G01S 13/931; G01S 13/935; G08G 1/0967; G05D 1/0044; G05D 1/0077
See application file for complete search history.

(56) References Cited

U.S. PATENT DOCUMENTS

| | | | |
|---|---|---|---|
| 7,272,179 B2 | 9/2007 | Siemens et al. | |
| 7,782,363 B2 | 8/2010 | Ortiz | |
| 8,311,983 B2 | 11/2012 | Guzik | |
| 9,792,656 B1 * | 10/2017 | Konrardy | G08G 1/096783 |
| 10,026,314 B1 * | 7/2018 | Philosof | G08G 1/0141 |
| 10,048,700 B1 * | 8/2018 | Curlander | G08G 1/0116 |
| 10,145,684 B1 * | 12/2018 | Tofte | G06Q 40/08 |

(Continued)

OTHER PUBLICATIONS

Greeling, Kelly Y., "Autonomous Robots in Law Enforcement: Future Legal and Ethical Issues" (2013). Research Papers. Paper 329. (43 Pages).

*Primary Examiner* — Hoi C Lau
(74) *Attorney, Agent, or Firm* — Griffiths & Seaton PLLC (57) ABSTRACT

Embodiments for utilizing vehicles to investigate events are provided. Spatiotemporal information is received from each of a plurality of vehicles. Each of the plurality of vehicles includes an onboard sensor. Information associated with an event is received. At least some of the plurality of vehicles are selected based on the information associated with the event and the spatiotemporal information from each of a plurality of vehicles. A request is caused to be transmitted to each of the selected at least some of the plurality of vehicles for data detected by the respective onboard sensor.

18 Claims, 6 Drawing Sheets

(56) References Cited

U.S. PATENT DOCUMENTS

| | | | |
|---|---|---|---|
| 10,176,524 B1* | 1/2019 | Brandmaier | G06Q 40/08 |
| 10,460,534 B1* | 10/2019 | Brandmaier | G07C 5/008 |
| 10,473,793 B2* | 11/2019 | Neubecker | G01S 19/31 |
| 10,497,262 B2* | 12/2019 | Salomonsson | F02D 41/065 |
| 10,633,091 B2* | 4/2020 | Lavie | H04N 7/185 |
| 10,661,795 B1* | 5/2020 | Li | B60W 30/0956 |
| 2004/0148090 A1* | 7/2004 | Melen | G01C 21/26 701/482 |
| 2005/0063565 A1* | 3/2005 | Nagaoka | B60R 21/013 382/104 |
| 2006/0137018 A1 | 6/2006 | Herschaft | |
| 2010/0245582 A1 | 9/2010 | Harel | |
| 2010/0256863 A1* | 10/2010 | Nielsen | G06T 11/60 701/31.4 |
| 2011/0313665 A1* | 12/2011 | Lueke | G01S 13/931 701/301 |
| 2013/0342333 A1* | 12/2013 | Hutchings | H04N 7/18 340/435 |
| 2014/0009307 A1* | 1/2014 | Bowers | G08G 1/161 340/901 |
| 2014/0118140 A1 | 5/2014 | Amis | |
| 2014/0220966 A1* | 8/2014 | Muetzel | H04W 4/024 455/426.1 |
| 2015/0077270 A1* | 3/2015 | Rubin | G01C 21/3658 340/903 |
| 2016/0071418 A1* | 3/2016 | Oshida | B60W 30/165 701/23 |
| 2016/0260328 A1* | 9/2016 | Mishra | G01S 5/0284 |
| 2016/0277911 A1* | 9/2016 | Kang | H04B 1/3822 |
| 2016/0286156 A1 | 9/2016 | Kovac | |
| 2017/0132922 A1* | 5/2017 | Gupta | G06F 3/0482 |
| 2017/0132923 A1* | 5/2017 | Li | G08G 1/0112 |
| 2017/0142374 A1 | 5/2017 | Berg | |
| 2017/0158196 A1* | 6/2017 | Park | B60W 30/18163 |
| 2017/0182985 A1* | 6/2017 | Dai | G08G 1/096716 |
| 2017/0243485 A1* | 8/2017 | Rubin | H04L 67/12 |
| 2018/0077518 A1* | 3/2018 | Nguyen | G08G 5/0008 |
| 2018/0218607 A1* | 8/2018 | Baghel | G08G 1/161 |
| 2018/0227729 A1* | 8/2018 | Bai | G08G 1/22 |
| 2018/0308360 A1* | 10/2018 | Regmi | G08G 1/0965 |
| 2019/0049997 A1* | 2/2019 | Battles | G05D 1/0297 |
| 2019/0051061 A1* | 2/2019 | Battles | G07C 5/0825 |
| 2019/0138007 A1* | 5/2019 | Baghsorkhi | G08G 1/091 |
| 2019/0144001 A1* | 5/2019 | Choi | B60W 50/14 701/117 |
| 2019/0197899 A1* | 6/2019 | Lim | G08G 1/052 |
| 2019/0220011 A1* | 7/2019 | Della Penna | G08G 1/0133 |
| 2019/0248396 A1* | 8/2019 | Khosla | B61L 23/34 |
| 2019/0256088 A1* | 8/2019 | Sharma | B60W 60/001 |
| 2019/0266644 A1* | 8/2019 | Cho | H04W 4/44 |
| 2019/0272760 A1* | 9/2019 | McQuillen | G08G 1/0968 |
| 2019/0370569 A1* | 12/2019 | Gulati | G01S 7/003 |
| 2020/0017108 A1* | 1/2020 | Bae | H04W 4/46 |
| 2020/0043342 A1* | 2/2020 | Cunningham | B60W 30/0953 |
| 2020/0086853 A1* | 3/2020 | Kumar | G05D 1/0088 |
| 2020/0257308 A1* | 8/2020 | Herman | G05D 1/0061 |
| 2020/0269864 A1* | 8/2020 | Zhang | G05D 1/0257 |
| 2020/0283012 A1* | 9/2020 | Kozak | G08G 1/166 |
| 2020/0285255 A1* | 9/2020 | Kozak | G05D 1/12 |

* cited by examiner

METHODS AND SYSTEMS FOR UTILIZING VEHICLES TO INVESTIGATE EVENTS

BACKGROUND OF THE INVENTION

Field of the Invention

The present invention relates in general to computing systems, and more particularly, to various embodiments for utilizing vehicles and/or sensors onboard vehicles to investigate events.

Description of the Related Art

In recent years, it has become increasingly common for vehicles (e.g., automobiles, aircraft, watercraft, etc.) to be equipped with various types of onboard sensors, such as cameras and microphones. For example, many civilian automobiles now have "dash cams" (or dash cameras) installed thereon (e.g., either as part of the vehicle's original equipment or installed by the owner/driver themselves), similar to those used by law enforcement agencies. Dash cams are typically oriented in such a way to record events as seen through the windshield (e.g., a view similar to that of the driver when operating the vehicle) and store the data locally (i.e., on a memory device within/on the vehicle).

It is not uncommon for authorities (e.g., law enforcement personnel), or even civilians, to request (e.g., via various media outlets) such data from any drivers who think their devices may have captured (or recorded) a particular event or part of an event, such as the commission (or committing) of a crime, an accident, or some other unusual occurrence. For example, law enforcement personnel may provide the location and time of the commission of a crime and request that any drivers who operate vehicles equipped with dash cams, and were in the vicinity around the same time, submit the appropriate video (or images) captured by their dash cams to assist in the investigation of the crime.

However, even when individuals are willing to assist in such a manner, the data submitted is usually selected by the drivers (or owners) of the vehicles, who are typically civilians with little or no law enforcement experience. As such, most the data submitted is of little use to law enforcement (or other personnel investigating some other type of event). Additionally, even if it was possible to collect all of the data from every relevant vehicle, utilizing such may be very impractical given the amount of data that may have to be collected, maintained, and processed.

SUMMARY OF THE INVENTION

Various embodiments for utilizing vehicles to investigate events, by a processor, are provided. Spatiotemporal information is received from each of a plurality of vehicles. Each of the plurality of vehicles includes an onboard sensor. Information associated with an event is received. At least some of the plurality of vehicles are selected based on the information associated with the event and the spatiotemporal information from each of a plurality of vehicles. A request is caused to be transmitted to each of the selected at least some of the plurality of vehicles for data detected by the respective onboard sensor.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As discussed above, in recent years, it has become increasingly common for vehicles (e.g., automobiles, aircraft, watercraft, etc.) to be equipped with various types of sensors (and/or to have sensors onboard), such as cameras and microphones. For example, many civilian automobiles now have "dash cams" (or dash cameras) installed thereon (e.g., either as part of the vehicle's original equipment or installed by the owner/driver themselves), similar to those used by law enforcement agencies. Dash cams are typically oriented in such a way to record events as seen through the windshield (e.g., a view similar to that of the driver when operating the vehicle) and store the data locally (i.e., on a memory device within/on the vehicle).

It is not uncommon for authorities (e.g., law enforcement personnel), or even civilians, to request (e.g., via various media outlets) such data from any drivers who think their devices may have captured (or recorded) a particular event or part of an event, such as the commission (or committing) of a crime, an accident, or some other unusual occurrence. For example, law enforcement personnel may provide the location and time of the commission of a crime and request that any drivers who operate vehicles equipped with dash cams, and were in the vicinity around the same time, submit the appropriate video (or images) captured by their dash cams to assist in the investigation of the crime.

However, even when individuals are willing to assist in such a manner, the data submitted is usually selected by the drivers (or owners) of the vehicles, who are typically civilians with little or no law enforcement experience. As such, most the data submitted is of little use to law enforcement (or other personnel investigating some other type of event). Additionally, even if it was possible to collect all of the data from every relevant vehicle, utilizing such may be very impractical given the amount of data that may have to be collected, maintained, and processed.

To address these needs and/or the shortcomings in the prior art, in some embodiments described herein, methods and/or systems are disclosed that utilize the (local/onboard) storage capabilities of dash cams (or other types of sensors) and vehicle connectivity to request relevant data from only particular vehicles to help investigate events, such as the commissions of crimes, accidents, and/or other unusual occurrences. The vehicles utilized may include civilian vehicles, government vehicles (e.g., law enforcement vehicles), and/or a combination thereof. Additionally, various types of vehicles may be utilized, such as automobiles, aircraft, and watercraft, which may or may not be operated by individuals/humans (e.g., unmanned aerial vehicles (UAVs), driverless/autonomous automobiles, or other unmanned vehicles/drones may be utilized).

In some embodiments, memory devices onboard the vehicles are utilized to store relatively high resolution (or "complete" or "full") data (at least temporarily, until the high resolution data is requested, as described below). In other words, in some embodiments, such high resolution data is not regularly stored centrally (e.g., on a central server/memory), as doing so may not be optimal given the total amount of data available from multiple vehicles and the relatively low frequency of events of interest. Rather, in some embodiments, at least some of the available data is only requested and received (from selected vehicles) as needed. Additionally, in some embodiments, the methods (and/or systems) described herein do not depend on onboard (or in-vehicle) modules to detect relevant events (e.g., crimes, accidents, etc.)

In some embodiments, the system utilizes (or includes) multiple (e.g., dozens, hundreds, thousands, etc. of) vehicles (e.g., automobiles), perhaps with permission of the owner/driver of each vehicle, which are equipped with at least one sensor (e.g., a camera and/or a microphone) and at least one memory device to store the data detected (or collected) by the sensor(s) locally. The vehicles may also be equipped with one or more devices that detect or determine spatiotemporal information (e.g., timestamped location, movements, orientation/heading, etc.) related to the vehicles, such as a Global Positioning System (GPS) module, a compass, etc. Additionally, the vehicles may be equipped with (and/or have installed thereon) a transmitter and/or receiver (or transceiver) to receive and transmit various types of requests/data (e.g., via any suitable wireless communication network or protocol). The vehicles utilized in this manner may be referred to as "recording vehicles."

In some embodiments, when the vehicles (or recording vehicles) are deployed and/or operated (e.g., automobiles are driven, parked, etc.), the onboard sensor(s) record data (e.g., video content), which is stored locally. The vehicles (and/or computing systems onboard the vehicles) periodically submit various types of data to a central server or control system (e.g., automatically and/or with permission of and/or intervention by the owner/driver), such as spatiotemporal information and a vehicle identifier (or vehicle identification (or ID)), or such information is determined in another manner (e.g., received from a GPS system monitoring the vehicles). Additionally, the vehicles may automatically submit portions of the data recorded by the onboard sensor(s), such as individual video frames (or images). Also, in some embodiments, the vehicles (and/or computing systems onboard the vehicles) are configured to detect particular types of events and/or objects (e.g., via a computer vision technique and/or cognitive analysis), such as accidents, suspicious activity, etc., and submit portions of the data (e.g., video frames) associated with the detected activity.

In some embodiments, when a relevant event has occurred (e.g., detected/made known in a manner external to the vehicles), such as a crime, an accident, etc., a user (e.g., an investigator, law enforcement personnel, etc.) may provide (or submit) a query related to the event to the system and/or information related to the event may be automatically sent to (or received/retrieved by) the system from an external source (e.g., another computing system, a newsfeed, etc.). The query (or information) may include spatiotemporal information associated with (or of) the event (e.g., time and place/location or time/place ranges or windows). The system may then compare the spatiotemporal information of the event with the spatiotemporal information received from the vehicles. Based on this comparison, the system may select particular vehicles from the available recording vehicles as being relatively likely to have recorded/captured (additional) information related to the event. Additionally, the system may retrieve data portions (e.g., video frames, images, etc.) previously submitted from the selected vehicles (if available), which may be provided to the user and/or utilized by the system to determine the probative value of the data recorded by those vehicles.

In some embodiments, the system sends a request (e.g., via wireless communications) to each of the selected vehicles for data recorded by the respective onboard sensor(s). For example, the system may request a particular segment (or time frame) of the video recorded by the dash cam of particular vehicle (e.g., based on the vehicle's location and/or orientation at or around the time of the event). In some embodiments, a list of the selected vehicles is provided to the user, and such requests are initiated and/or limited by the user, such as after viewing previously submitted data portions from the vehicles. For example, in embodiments in which the user is able to view data portions previously submitted by the vehicles, they (and/or the system) may be able to determine that the data recoded by some of the selected vehicles is of little use (e.g., a previously submitted video frame indicates that a particular recording vehicle was parked behind a large truck that obscured the view of the event) and omit requesting additional data from those vehicles.

The selected vehicles (and/or the vehicles to which requests were sent) may then submit (or transmit) the appropriate data (e.g., full resolution/complete videos) to the system (e.g., via wireless communications). The user may then view and analyze the data, for example, as part of an investigation into the event. For example, if the event is the commission of a crime, the user may search the videos received from the selected vehicles for entities (e.g., individuals, other vehicles, etc.) that may be involved with the crime.

In some embodiments, entities (or other elements) identified in the data may be "tracked" (backwards or forwards in time) in such a way to identify other available recording vehicles that may have recorded (additional) relevant data. For example, when viewing a video recorded by a particular vehicle (or recording vehicle), the user may identify another vehicle of interest in the video (e.g., a vehicle potentially involved in the commission of a crime or "suspect vehicle"), along with relevant information associated with the suspect vehicle, such as the direction in which the suspect vehicle is/was moving, which may then be utilized to identify other recording vehicles which may have captured video of the suspect vehicle along its trajectory. In other words, as one example, if a recorded video shows a suspect vehicle moving north from a particular area, the system may search for recording vehicles that were located to the north of the area at the time the suspect vehicle was recorded as moving north. The system and/or the user may track any entities of interest by repeating this process.

This process may be performed based on user input (e.g., tagging particular videos, indicating directions of travel, etc.). However, it should be understood that object detection, computer vision techniques, cognitive analyses, etc. may be performed/utilized by the system for this process, along with other aspects of functionality described herein. For example, the system may automatically analyze (or "mine") any received data (e.g., before and/or after requests were sent to selected vehicles) to search for particular entities (e.g., individuals, objects, etc.) using object detection, motion detection, facial recognition, etc. As a particular example, if the system is provided with information about an event that includes a model, color, and/or license plate of a particular vehicle of interest, along with spatiotemporal information about the event, the system may automatically select particular recording vehicles, retrieve data from those vehicles, and search the received data for the vehicle of interest. If the system is able to identify the vehicle of interest (or suspect vehicle) in the data, the system may automatically track the vehicle as described above (e.g., utilizing other appropriate recording vehicles) and/or indicate the identification of the vehicle of interest to the user.

As such, it should be understood that at least some of the aspects of functionality described herein may be performed utilizing a cognitive analysis. The cognitive analysis may include the utilization of, for example, region-based convolutional neural network (R-CNN) pixel mapping (e.g., for object detection/classification in images/videos) and Mel-frequency cepstral coefficients (MFCCs) (e.g., for audio content), as are commonly understood.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the utilization of vehicles to investigate events, as described herein. Utilizing the models, the performance (or operation) of the system (e.g., utilizing/based on new inputs) may be predicted and/or the performance of the system may be optimized by investigating how changes in the input(s) effect the output(s). Feedback received from (or provided by) users and/or administrators may also be utilized, which may allow for the performance of the system to further improve with continued use.

It should be understood that as used herein, the term "computing node" (or simply "node") may refer to a computing device, such as a vehicular computing system (or vehicle), mobile electronic device, desktop computer, etc. and/or an application, such a chatbot, an email application, a social media application, a web browser, etc. In other words, as used herein, examples of computing nodes include, for example, vehicles (or vehicular computing systems) and computing devices such as mobile phones, tablet devices, desktop computers, or other devices, such as appliances (IoT appliances) that are owned and/or otherwise associated with individuals (or users), and/or various applications that are utilized by the individuals on such computing devices.

In particular, in some embodiments, a method for utilizing vehicles to investigate events, by a processor, is provided. Spatiotemporal information is received from each of a plurality of vehicles. Each of the plurality of vehicles includes an onboard sensor. Information associated with an event is received. At least some of the plurality of vehicles are selected based on the information associated with the event and the spatiotemporal information from each of a plurality of vehicles. A request is caused to be transmitted to each of the selected at least some of the plurality of vehicles for data detected by the respective onboard sensor.

The spatiotemporal information from each of the plurality of vehicles may include at least one of a timestamped location of the respective vehicle, movement of the respective vehicle, and orientation of the respective vehicle. The onboard sensor of each of the plurality of vehicles may include a camera, and the data detected by the onboard sensors may include at least one image.

The information associated with the event may include at least one of spatiotemporal information of the event and information related to an entity associated with the event. If the information associated with the event includes spatiotemporal information of the event, the selecting of the at least some of the plurality of vehicles may be based on a comparison of the spatiotemporal information of the event and the spatiotemporal information from each of the plurality of vehicles.

The data detected by the respective onboard sensor from the selected at least some of the plurality of vehicles may be received. The received data may be analyzed to identify at least one entity associated with the event. The entity may be tracked (or caused to be tracked). The tracking of the entity may include, for example, selecting others of the plurality of vehicles and causing a second request to be transmitted to each of the others of the plurality of vehicles for data detected by the respective onboard sensor. Each of the plurality of vehicles may include at least one of an automobile, an aircraft, or a watercraft.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
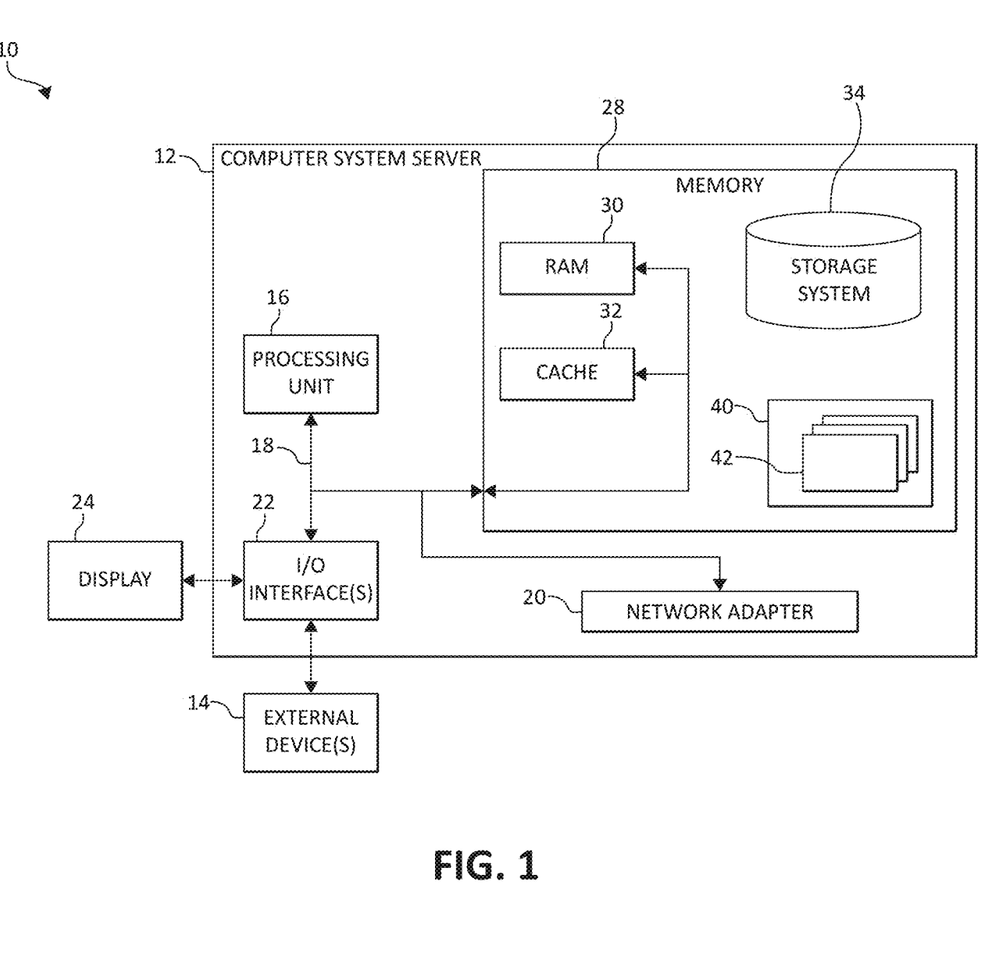
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
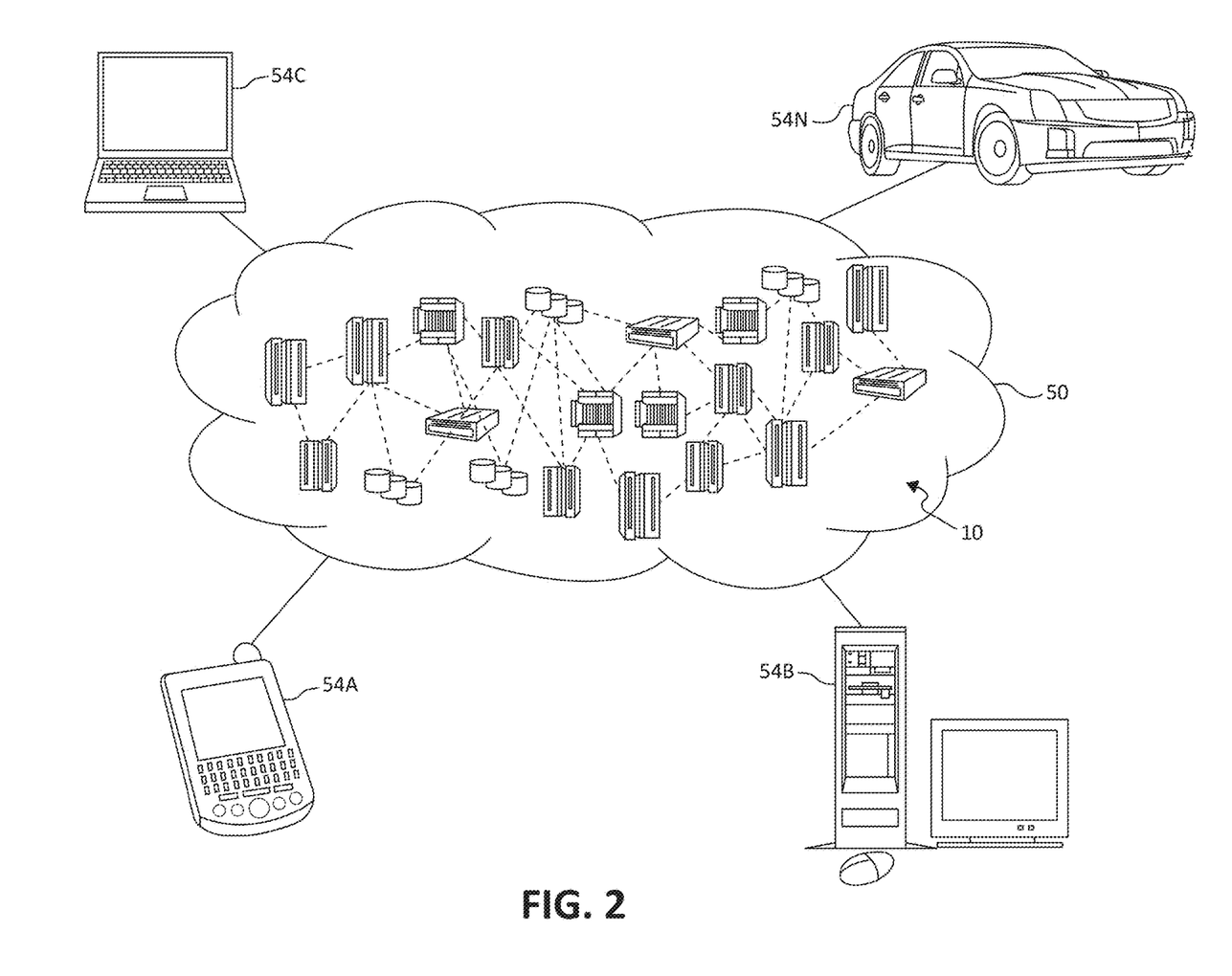
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
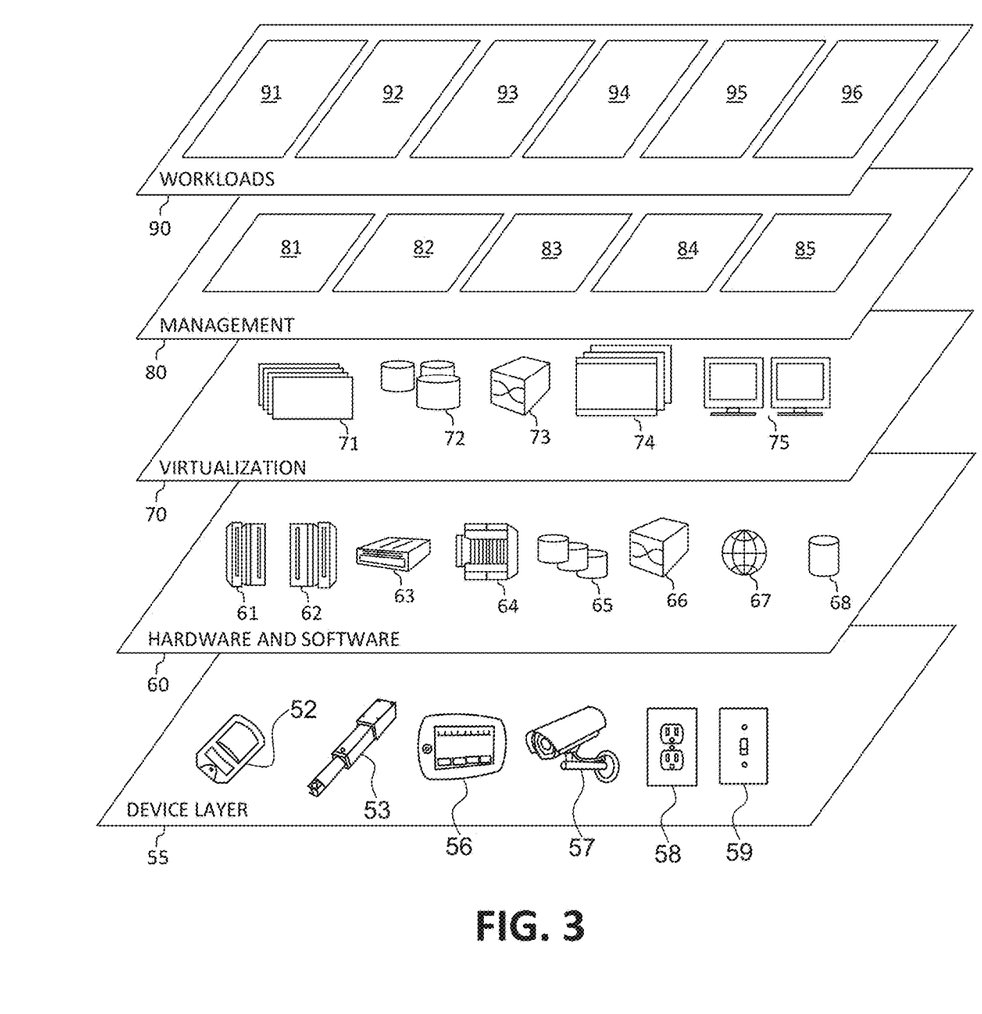
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch

59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for utilizing vehicles to investigate events, as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and/or systems for utilizing vehicles to investigate at least one event are provided. In some embodiments, multiple vehicles (or recording vehicles) equipped with one or more sensor record and store data (e.g., video content) locally while the vehicles are deployed (e.g., moving, parked, etc.). The vehicles (and/or computing systems therein) may periodically submit information associated with the vehicle, such as a vehicle ID, spatiotemporal information (e.g., GPS location, heading/orientation, etc.), and perhaps portions of the data recorded by the sensor(s), such as video frames, to a central system (e.g., via the cloud, wireless communications, etc.).

A user (e.g., a security agent, a law enforcement investigator, etc.) seeking evidence related to an event (e.g., a crime, accident, etc.) may query the system using the appropriate time and location of the event (or such information may be automatically provided to the system). The system may retrieve (or identify) the relevant recording vehicles, perhaps along with available data samples submitted by the recording vehicles around the time and location of the incident. The user (and/or the system) may then, for example, identify (or select) recording vehicles that may have recorded data related to the event. The system (and/or the user) may then request (additional) data (e.g., full videos) from the selected recording vehicles for further analysis. The system (and/or the user) may then search (or mine) the received data to, for example, to identify the event or at least one entity of interest associated with the event (e.g., a suspect vehicle, individual, etc.). The user (and/or the system) may then track the target event or entity (or entities) (backward or forward in time) by repeating the above process, while searching in the correct (spatial) direction for additional recording vehicles that may have recorded additional evidence.

Figure 4:
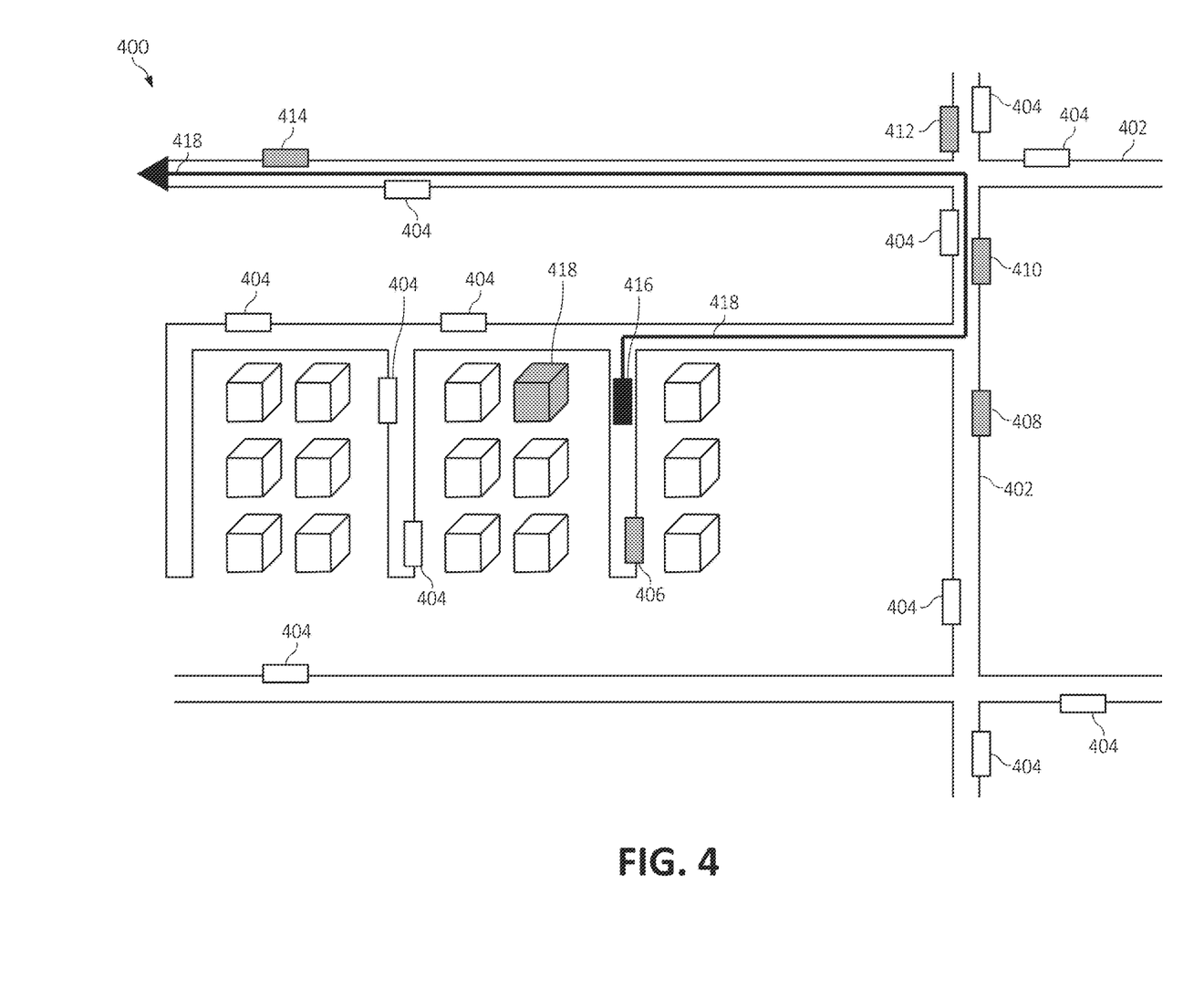
FIG. 4 is a plan view of an exemplary environment in which the methods and systems described herein may be utilized according to an embodiment of the present invention.

FIG. 4 illustrates an exemplary environment 400 (or a map thereof) in which the methods and systems described herein may be implemented. In the example shown, the environment 400 includes multiple roads (or roadways) 402 with multiple vehicles (e.g., automobiles) deployed throughout. The vehicles include non-recording vehicles 404, recording vehicles 406-414, and a suspect vehicle 416, as described in greater detail below.

The non-recording vehicles 404 may be considered to be vehicles that are not configured to be utilized with/by the methods/systems described herein. For example, the non-recording vehicles 404 may not be equipped with appropriate sensors and/or registered with the system and/or permission for them to be utilized by the system may not have been granted by the owners thereof. The non-recording vehicles 404 may also be vehicles that are configured to be utilized with the methods/systems described herein but do not capture/record any data that is relevant to the investigation(s) of particular event(s) of interest.

In contrast, the recording vehicles 406-414 may be considered to be vehicles that are configured to be utilized by the methods/systems described herein. For example, the recording vehicles 406-414 may include at least one sensor (e.g., a camera), a GPS module, transceiver, etc. and may be registered/authorized to be utilized by the system. As described above, the recording vehicles 406-414 may continuously record data utilizing their onboard sensor(s) and periodically transmit information (and/or data) to a central server or control system, which may include spatiotemporal information of the recording vehicles, vehicle IDs, etc., perhaps along with portions of recorded data (e.g., video frames), while storing full/complete versions of the data locally (e.g., in an onboard memory device).

Still referring to FIG. 4, as one exemplary scenario, assume that a crime (e.g., a burglary) has been reported as occurring at location 418 (e.g., a residence) at a particular time. A user (e.g., a law enforcement investigator) queries the central system for available recording vehicles that may have recorded data relevant to the crime, including a time and place (e.g., location 418) (or approximate time/place, time/place ranges, etc.) of the event (and/or such information is automatically provided to/received by the system).

The system searches the information received by the recording vehicles 406-414 to determine which, if any, of the recording vehicles 406-414 may have recorded any relevant data (e.g., based on a comparison on the spatiotemporal information associated with the event and the spatiotemporal information received from the recording vehicles).

In the particular example shown, the system determines that recording vehicle 406 was in an appropriate location (with an appropriate orientation/heading) to possibly capture some evidence of the crime. For example, it may be determined that recording vehicle 406 was within a predetermined distance (e.g., 50 meters) of the location of the event (e.g., location 418) and/or oriented in an appropriate direction at or around the time the event occurred. As such, recording vehicle 406 may be selected by the system, and if available, the system may analyze any previously received sensor data (e.g., video frames) from recording vehicle 406 and/or provide such to the user. The system (and/or the user) may also transmit a request to recording vehicle 406 for additional data (e.g., a full/complete recording captured by the onboard sensor at/around the time of the crime). In some embodiments, such a request is only sent if previously submitted data (e.g., a video frame) indicates that the sensor was able to capture useful data (e.g., the view/line of sight of the sensor was not obscured), which may be determined by the user and/or automatically by the system. Upon receiving the request, recording vehicle 406 transmits the appropriate data to the system.

When the data (e.g., full video) is received, the user and/or the system may analyze the data to determine if it includes any useful evidence. In the depicted embodiment, it should be assumed that recording vehicle 406 was able to capture/record suspect vehicle 416 at location 418 at/around the time the event occurred, which may be determined by the user and/or automatically by the system (e.g., via object detection or classification). Depending on, for example, the distance between recording vehicle 406 and the suspect vehicle 416, the quality (e.g., resolution) of the data, etc., the user may be able to gather sufficient information about the suspect vehicle (e.g., make, color, license plate, etc.).

However, if additional evidence (or data) is required (or regardless of whether that is the case), the user and/or system may be able "track" the suspect vehicle 416. For example, still referring to FIG. 4, path 418 indicates the movement(s) of the suspect vehicle 416 after it left location 418. In particular, immediately after leaving location 418, the suspect vehicle 416 turned right (or "east") as viewed in FIG. 4, which may be shown in the data collected by recording vehicle 406. This movement (or direction of movement) may be identified by the user and/or the system and then utilized to search for additional recording vehicles that may also have captured/recorded the suspect vehicle 416 as it traveled along path 418. In other words, in some embodiments, this additional information may be utilized by the system to repeat the process described above and select additional appropriate recording vehicles (if available). For example, in the depicted embodiment, recording vehicles 408 and 410 may then be selected and appropriate requests may be sent thereto. In particular, in the depicted embodiment, recording vehicles 408 and 410 may have captured/recorded the suspect vehicle 416 as it then turned and proceeded "north," perhaps along with additional information about the suspect vehicle 416 (e.g., an image of the driver, the license plate, etc.).

With this information, the system (and/or the user) may then again search for yet additional recording vehicles to further track the suspect vehicle 416. For example, recording vehicle 412 may have captured/recorded the suspect vehicle 416 turning "west" along path 418, and recording vehicle 414 may have captured/recorded the suspect vehicle 416 as it continued in that same direction. This process may be repeated until sufficient evidence is gathered (e.g., as determined by the user) and/or no additional evidence can be found (e.g., no additional recording vehicles were appropriately located and/or were able to capture/record the suspect vehicle 416 such that it can not be tracked further).

Figure 5:
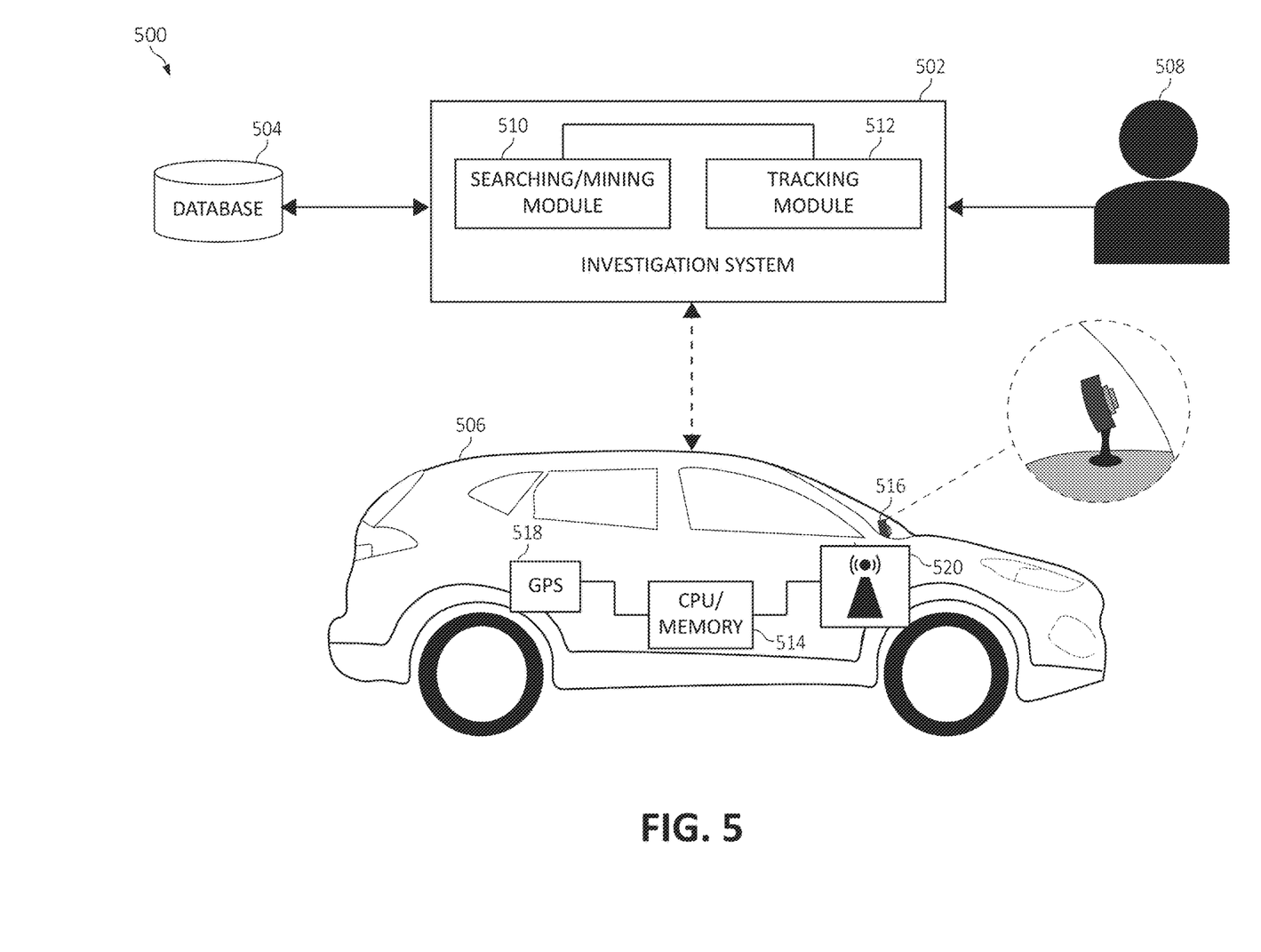
FIG. 5 is a block diagram of a system for utilizing vehicles to investigate events according to an embodiment of the present invention.

FIG. 5 illustrates a system 500 (or portion thereof) for utilizing vehicles to investigate events according to an embodiment of the present invention. The system 500 includes an investigation system (or sub-system) 502, a database 504, and at least one (or multiple) recording vehicle(s) 506.

The investigation system 502 may be implemented using any suitable computing device (or node), such as those described above (e.g., a desktop PC, a mobile electronic device, etc.), which may be utilized by a user (or individual) 508, such as an investigator, to investigate events, as described above. In the depicted embodiment, the investigation system 502 includes a search/mining module 510 and a tracking module 512. The search/mining module 510 may be configured to search information/data received from recording vehicles to, for example, select appropriate recording vehicles and/or analyze the information/data to identify, classify, etc. entities and/or the movements or actions thereof that are recorded in the data, as described above. The tracking module 512 may be configured to, for example, restrict/limit the search for appropriate recording vehicles based on the detected (or received) movement(s) of entities, as described above.

Although not shown, the investigation system 502 (and/or the search/mining module 510) may include a cognitive module that is configured to perform any cognitive analyses described herein (e.g., object detection/classification, etc.). Additionally, the investigation system 502 may include a display device and/or speaker to render various types of content (e.g., images, videos, sounds, etc.) and one or more user input device (e.g., a keyboard, mouse, touchscreen, etc.) that may be utilized by the user 508 (e.g., to initiate/perform investigations).

The database 504 may include one or more memory devices on which information/data received from recording vehicles may be stored. For example, the database 504 may be utilized to store spatiotemporal information from recording vehicles, data portions (e.g., video frames) received from recording vehicles (and any associated tags, metadata, etc.), and full/complete recordings (e.g., after such has been requested/received from appropriate recording vehicles). The investigation system 502 may suitably access the database 504 to retrieve appropriate information/data based on the stage of the investigation, as described above. The database 504 may be integrated into a common computing device with the investigation system 502 and/or located remotely and in operable communication therewith via any suitable communication network (e.g., the Internet).

The vehicle (or recording vehicle) 506 may be any type of vehicle that may be utilized by the methods/systems described herein. As such, although the vehicle 506 shown in FIG. 5 is in the shape of an automobile, it should be understood that other types of vehicles may be utilized, such as aircraft, watercraft, drones, etc. In the depicted embodiment, the vehicle 506 includes a CPU/memory 514, at least one sensor 516, a GPS module 518, and a transceiver 520 (at least some of which may be contained within a module onboard the vehicle 506).

The CPU/memory 514 may include any suitable computing device that is configured to control the operation of the vehicle 506 with respect to investigating events as described herein and in operable communication with the sensor(s) 516, the GPS module 518, and the transceiver 520. The sensor(s) 516 may include a camera and/or a microphone. For example, the sensor(s) 516 may be in the form of a dash cam that is oriented in such a way to record events as seen through the windshield (e.g., a view similar to that of the driver when operating the vehicle). The GPS module 518 may be any module suitably configured to utilize the GPS system (or another radionavigation system) to determine the location and/or heading/orientation of the vehicle 506. Although not shown, the GPS module 518 (and/or the vehicle 506) may (also) include a compass. The transceiver 520 may include any suitable receiver and/or transmitter to receive/transmit information/data via any suitable wireless communication protocol.

When the vehicle 506 is deployed, the CPU/memory 514 may periodically (e.g. once every 30 minutes) cause spatiotemporal information about the vehicle 506, perhaps along with a small portion of data recorded by the sensor(s) 516 (e.g. a video frame captured by the dash cam), to be transmitted to the investigation system 502 via the transceiver 520, while causing full/complete data (e.g. videos) to be stored in local memory (e.g., within the CPU/memory 514). When an appropriate request is received from the investigation system 502, the CPU/memory 514 may then cause the relevant full/complete data portions to be transmitted, as described above. Additionally, the CPU/memory 514 may utilize data recorded by the sensor(s) 516 to identify suspicious events (e.g., via a cognitive module/analysis), record at least a portion thereof, and cause at least portions of such data to be transmitted to the investigation system 502 (e.g., automatically and/or without a request for such data being sent to the vehicle 506).

Figure 6:
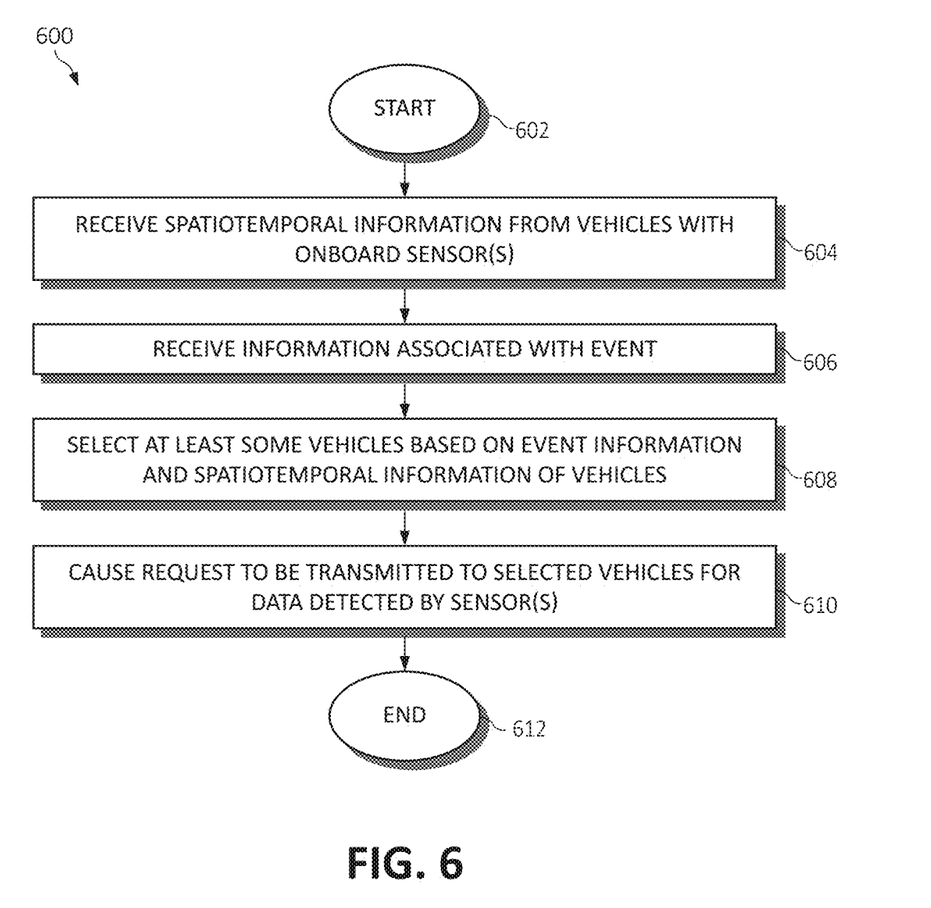
FIG. 6 is a flowchart diagram of an exemplary method for utilizing vehicles to investigate events according to an embodiment of the present invention.

Turning to FIG. 6, a flowchart diagram of an exemplary method 600 for utilizing vehicles to investigate (one or more) events is provided. The method 600 begins (step 602) with, for example, multiple vehicles (or at least one vehicle), such as the recording vehicles described above, being deployed in an environment. In some embodiments, permission/authorization from the owner (or driver, etc.) of each of the vehicles to utilize the vehicles as described herein is received (e.g., before or after the occurrence of a particular event of interest).

Spatiotemporal information is received from (or for) each of vehicles (step 604). Each of the plurality of vehicles includes an onboard sensor and may be, for example, an automobile, an aircraft, and/or a watercraft. The onboard sensor may include, for example, a camera and/or a microphone, and full/complete versions of data recorded by the sensor may be stored on a memory onboard the respective vehicle. The spatiotemporal information from each of the vehicles may include timestamped location(s) of the respective vehicle, movement(s) of the respective vehicle, and/or an orientation(s) of the respective vehicle. The spatiotemporal information may be, for example, determined via a GPS module (e.g., onboard the vehicles) and be periodically (e.g., every minute, or every few minutes, etc.) transmitted (e.g., to a central server/system) from the vehicles automatically. In some embodiments, portions (e.g., video frames) of the data recorded by the sensors onboard the vehicles are also transmitted (e.g., along with the spatiotemporal information).

Information associated with an event is received (step 606). The information associated with the event may include spatiotemporal information of the event (e.g., a time and location of the event) and/or information related to an entity associated with the event (e.g., a vehicle type, color, etc., direction of travel of the entity, etc.). The information associated with the event may be received via a query provided by a user (e.g., law enforcement personnel) to the centralized system and/or automatically received from a data source (e.g., a newsfeed, event reporting system, etc.).

At least some of the plurality of vehicles is/are selected based on the information associated with the event and the spatiotemporal information from each of a plurality of vehicles (step 608). The selecting of the at least some of the plurality of vehicles may be based on a comparison of the spatiotemporal information of the event and the spatiotemporal information from each of the plurality of vehicles, as described above.

A request is caused to be transmitted to each of the selected at least some of the plurality of vehicles for data detected by the respective onboard sensor (step 610). The data detected by the onboard sensors may include at least one image (e.g., in embodiments in which the onboard sensor includes a camera).

Method 600 ends (step 612) with, for example, the requested data detected by the sensors onboard the vehicles being received (and/or transmitted by the vehicles). The user (and/or the central system) may utilize the data to investigate the event. For example, the user may view full/complete videos recorded by cameras onboard the vehicles via a display device of a computer system. Based on the recorded data, the user and/or the system (e.g., the tracking module) may repeat the process by, for example, providing additional information associated with the event, which may be utilized to identify additional vehicles that may have captured/recorded additional data that may further assist in the investigation, as described above. In some embodiments, feedback from users may also be utilized to improve the performance of the system over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for utilizing vehicles to investigate events, comprising:
   receiving spatiotemporal information from each of a plurality of vehicles, wherein each of the plurality of vehicles includes an onboard sensor;
   receiving information associated with an event, wherein the information associated with the event includes spatiotemporal information of the event;
   selecting at least some of the plurality of vehicles based on the information associated with the event and the spatiotemporal information from each of a plurality of vehicles, wherein the selecting of the at least some of the plurality of vehicles is based on a comparison of the spatiotemporal information of the event and the spatiotemporal information from each of the plurality of vehicles; and
   causing a request to be transmitted to each of said selected at least some of the plurality of vehicles for data detected by the respective onboard sensor.

2. The method of claim 1, wherein the spatiotemporal information from each of the plurality of vehicles includes at least one of a timestamped location of the respective vehicle, movement of the respective vehicle, and orientation of the respective vehicle.

3. The method of claim 1, wherein the onboard sensor of each of the plurality of vehicles includes a camera, and wherein the data detected by the onboard sensors include at least one image.

4. The method of claim 1, wherein the information associated with the event further includes information related to an entity associated with the event.

5. The method of claim 1, further comprising receiving said data detected by the respective onboard sensor from said selected at least some of the plurality of vehicles.

6. The method of claim 5, further comprising:
analyzing said received data to identify at least one entity associated with the event; and
tracking the entity associated with the event, wherein said tracking of the entity includes selecting others of the plurality of vehicles and causing a second request to be transmitted to each of the others of the plurality of vehicles for data detected by the respective onboard sensor.

7. A system for utilizing vehicles to investigate events comprising:
a processor executing instructions stored in a memory device, wherein the processor:
receives spatiotemporal information from each of a plurality of vehicles, wherein each of the plurality of vehicles includes an onboard sensor;
receives information associated with an event, wherein the information associated with the event includes spatiotemporal information of the event;
selects at least some of the plurality of vehicles based on the information associated with the event and the spatiotemporal information from each of a plurality of vehicles, wherein the selecting of the at least some of the plurality of vehicles is based on a comparison of the spatiotemporal information of the event and the spatiotemporal information from each of the plurality of vehicles; and
causes a request to be transmitted to each of said selected at least some of the plurality of vehicles for data detected by the respective onboard sensor.

8. The system of claim 7, wherein the spatiotemporal information from each of the plurality of vehicles includes at least one of a timestamped location of the respective vehicle, movement of the respective vehicle, and orientation of the respective vehicle.

9. The system of claim 7, wherein the onboard sensor of each of the plurality of vehicles includes a camera, and wherein the data detected by the onboard sensors include at least one image.

10. The system of claim 7, wherein the information associated with the event further includes information related to an entity associated with the event.

11. The system of claim 7, wherein the processor further receives said data detected by the respective onboard sensor from said selected at least some of the plurality of vehicles.

12. The system of claim 11, wherein the processor further:
analyzes said received data to identify at least one entity associated with the event; and
tracks the entity associated with the event, wherein said tracking of the entity includes selecting others of the plurality of vehicles and causing a second request to be transmitted to each of the others of the plurality of vehicles for data detected by the respective onboard sensor.

13. A computer program product for utilizing vehicles to investigate events, by a processor, the computer program product embodied on a non-transitory computer-readable storage medium having computer-readable program code portions stored therein, the computer-readable program code portions comprising:
an executable portion that receives spatiotemporal information from each of a plurality of vehicles, wherein each of the plurality of vehicles includes an onboard sensor;
an executable portion that receives information associated with an event, wherein the information associated with the event includes spatiotemporal information of the event;
an executable portion that selects at least some of the plurality of vehicles based on the information associated with the event and the spatiotemporal information from each of a plurality of vehicles, wherein the selecting of the at least some of the plurality of vehicles is based on a comparison of the spatiotemporal information of the event and the spatiotemporal information from each of the plurality of vehicles; and
an executable portion that causes a request to be transmitted to each of said selected at least some of the plurality of vehicles for data detected by the respective onboard sensor.

14. The computer program product of claim 13, wherein the spatiotemporal information from each of the plurality of vehicles includes at least one of a timestamped location of the respective vehicle, movement of the respective vehicle, and orientation of the respective vehicle.

15. The computer program product of claim 13, wherein the onboard sensor of each of the plurality of vehicles includes a camera, and wherein the data detected by the onboard sensors include at least one image.

16. The computer program product of claim 13, wherein the information associated with the event further includes information related to an entity associated with the event.

17. The computer program product of claim 13, wherein the computer-readable program code portions further include an executable portion that receives said data detected by the respective onboard sensor from said selected at least some of the plurality of vehicles.

18. The computer program product of claim 17, wherein the computer-readable program code portions further include:
an executable portion that analyzes said received data to identify at least one entity associated with the event; and
an executable portion that tracks the entity associated with the event, wherein said tracking of the entity includes selecting others of the plurality of vehicles and causing a second request to be transmitted to each of the others of the plurality of vehicles for data detected by the respective onboard sensor.

* * * * *